US011950238B2

(12) United States Patent
Elshafie et al.

(10) Patent No.: US 11,950,238 B2
(45) Date of Patent: Apr. 2, 2024

(54) TECHNIQUES FOR A DELAY-IMPOSED HARQ-ACK/NACK REPORTING

(71) Applicant: QUALCOMM Incorporated, San Diego, CA (US)

(72) Inventors: Ahmed Elshafie, San Diego, CA (US); Yi Huang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/400,802

(22) Filed: Aug. 12, 2021

(65) Prior Publication Data

US 2022/0078832 A1 Mar. 10, 2022

Related U.S. Application Data

(60) Provisional application No. 63/076,727, filed on Sep. 10, 2020.

(51) Int. Cl.
*H04W 72/12* (2023.01)
*H04L 1/16* (2023.01)
*H04L 1/1607* (2023.01)
*H04L 5/00* (2006.01)
*H04W 72/04* (2023.01)
*H04W 72/0446* (2023.01)
*H04W 72/21* (2023.01)

(52) U.S. Cl.
CPC .......... *H04W 72/21* (2023.01); *H04L 1/1635* (2013.01); *H04L 1/1678* (2013.01); *H04L 5/0055* (2013.01); *H04W 72/0446* (2013.01)

(58) Field of Classification Search
CPC .............. H04W 72/21; H04W 72/0446; H04L 1/1635; H04L 1/1678; H04L 5/0055; H04L 1/1896; H04L 5/0078; H04L 1/1854; H04L 1/1835
See application file for complete search history.

(56) References Cited

U.S. PATENT DOCUMENTS 10,587,373 B1 * 3/2020 Wang ................. H04L 1/1877
2016/0302224 A1   10/2016 Khairmode et al.
(Continued)

FOREIGN PATENT DOCUMENTS

EP        2810392 A1    12/2014

OTHER PUBLICATIONS

International Search Report and Written Opinion—PCT/US2021/045993—ISA/EPO—dated Dec. 3, 2021.

*Primary Examiner* — Hoang-Chuong Q Vu
(74) *Attorney, Agent, or Firm* — Arent Fox, LLP

(57) ABSTRACT

Aspects of the present disclosure provide techniques to expedite transmissions of hybrid automatic repeat request (HARQ) acknowledgment or negative acknowledgment (ACK/NACK) feedbacks based on delay constraints associated with at least semi-persistent scheduling (SPS) downlink packets received at the user equipment (UE). Specifically, in accordance with aspects of the present disclosure, each of the one or more SPS PDSCH configurations may be associated with a delay parameter that identifies the maximum amount of time or slots that the UE can wait prior to transmitting the HARQ-ACK/NACK feedback associated with the PDSCH received at the UE.

24 Claims, 7 Drawing Sheets

(56) References Cited

U.S. PATENT DOCUMENTS

| | | | | |
|---|---|---|---|---|
| 2020/0389878 A1* | 12/2020 | Karaki | ............... | H04W 72/23 |
| 2021/0050950 A1* | 2/2021 | Zhou | ................ | H04L 1/1854 |
| 2021/0067276 A1* | 3/2021 | Wang | ................ | H04L 1/1861 |
| 2021/0234643 A1* | 7/2021 | Wang | ................ | H04L 5/0055 |
| 2021/0314084 A1* | 10/2021 | Hwang | .............. | H04L 1/1854 |
| 2021/0314095 A1* | 10/2021 | Gao | ................. | H04L 1/1812 |
| 2022/0007399 A1* | 1/2022 | Rastegardoost | ...... | H04L 1/1854 |
| 2022/0039127 A1* | 2/2022 | Li | ..................... | H04W 72/23 |
| 2022/0210802 A1* | 6/2022 | Hwang | .............. | H04L 1/1614 |
| 2022/0225400 A1* | 7/2022 | Wong | ............... | H04L 1/1854 |
| 2022/0256554 A1* | 8/2022 | Chen | ............... | H04W 72/0446 |
| 2022/0278807 A1* | 9/2022 | Zhang | .............. | H04W 72/0446 |
| 2022/0279545 A1* | 9/2022 | Yoshioka | .......... | H04W 76/15 |
| 2022/0286973 A1* | 9/2022 | Takahashi | .......... | H04W 52/146 |
| 2023/0074723 A1* | 3/2023 | Alfarhan | ............ | H04L 1/1685 |
| 2023/0076328 A1* | 3/2023 | Harada | .............. | H04L 1/1614 |
| 2023/0077055 A1* | 3/2023 | Gou | ................. | H04L 5/0055 |
| 2023/0106098 A1* | 4/2023 | Wang | ............... | H04W 72/21 370/329 |
| 2023/0284224 A1* | 9/2023 | Takahashi | .......... | H04W 72/566 370/329 |
| 2023/0299891 A1* | 9/2023 | Kittichokechai | ..... | H04L 1/1896 370/336 |
| 2023/0318748 A1* | 10/2023 | Yin | .................. | H04L 1/1854 370/329 |

* cited by examiner

TECHNIQUES FOR A DELAY-IMPOSED HARQ-ACK/NACK REPORTING

CROSS-REFERENCE TO RELATED APPLICATION(S)

The present application claims benefit of U.S. Provisional Application No. 63/076,727 entitled "TECHNIQUES FOR DELAY-IMPOSED HARQ-ACK/NACK REPORTING" filed Sep. 10, 2020, which is assigned to the assignee hereof and hereby expressly incorporated by reference herein.

TECHNICAL FIELD

The present disclosure relates to wireless communication systems, and more particularly, to techniques for a delay imposed hybrid automatic repeat request (HARQ) acknowledgment or negative acknowledgment (ACK/NACK) feedback reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques to expedite transmissions of hybrid automatic repeat request (HARQ) acknowledgment or negative acknowledgment (ACK/NACK) feedbacks based on delay constraints associated with at least semi-persistent scheduling (SPS) downlink packets received at the user equipment (UE). Specifically, in accordance with aspects of the present disclosure, each of the one or more SPS PDSCH configurations may be associated with a delay parameter that identifies the maximum amount of time or slots that the UE can wait prior to transmitting the HARQ-ACK/NACK feedback associated with the PDSCH received at the UE.

In one example, a method for wireless communication implemented by a UE is disclosed. The method may include receiving, at a user equipment (UE), a plurality of semi-persistent scheduling (SPS) downlink packets from a base station. The method may further comprise accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots. The method may further include determining whether a delay constraint for one or more HARQ-ACK/NACK feedbacks from the plurality of HARQ-ACK/NACK feedbacks exceeds a delay parameter value associated the plurality of SPS downlink packets. The method may further include transmitting, during a first uplink slot, a consolidated feedback packet to the base station that includes the one or more HARQ-ACK/NACK feedbacks for which the delay constraint exceeds the delay parameter value.

In another example, an apparatus for wireless communications. The apparatus may include a memory having instructions and a processor configured to execute the instructions to receive, at a UE, a plurality of SPS downlink packets from a base station. The processor may further be configured to execute the instructions to accumulate a plurality of HARQ-ACK/NACK feedbacks associated with each of the plurality of SPS downlink packets in a buffer prior to availability of one or more uplink slots. The processor may further be configured to execute the instructions to determine whether a delay constraint for one or more HARQ-ACK/NACK feedbacks from the plurality of HARQ-ACK/NACK feedbacks exceeds a delay parameter value associated the plurality of SPS downlink packets. The processor may further be configured to execute the instructions to transmit, during a first uplink slot, a consolidated feedback packet to the base station that includes the one or more HARQ-ACK/NACK feedbacks for which the delay constraint exceeds the delay parameter value in a first uplink slot.

In some aspects, a non-transitory computer readable medium includes instructions stored therein that, when executed by a processor, cause the processor to perform the steps of receiving, at a UE, a plurality of SPS downlink packets from a base station. The processor may further perform the steps of accumulating a plurality of HARQ-ACK/NACK feedbacks associated with each of the plurality of SPS downlink packets in a buffer prior to availability of one or more uplink slots. The processor may further perform the steps of determining whether a delay constraint for one or more HARQ-ACK/NACK feedbacks from the plurality of HARQ-ACK/NACK feedbacks exceeds a delay parameter value associated the plurality of SPS downlink packets. The processor may further perform the steps of transmitting, during a first uplink slot, a consolidated feedback packet to the base station that includes the one or more HARQ-ACK/NACK feedbacks for which the delay constraint exceeds the delay parameter value in a first uplink slot.

In certain aspects, another apparatus for wireless communication is disclosed. The apparatus may include means for receiving, at a UE, a plurality of SPS downlink packets from a base station. The apparatus may further include means for accumulating a plurality of HARQ-ACK/NACK feedbacks associated with each of the plurality of SPS downlink packets in a buffer prior to availability of one or more uplink slots. The apparatus may further include means for determining whether a delay constraint for one or more HARQ-ACK/NACK feedbacks from the plurality of HARQ-ACK/NACK feedbacks exceeds a delay parameter value associated the plurality of SPS downlink packets. The apparatus may further include means for transmitting, during a first uplink slot, a consolidated feedback packet to the base station that includes the one or more HARQ-ACK/NACK feedbacks for which the delay constraint exceeds the delay parameter value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
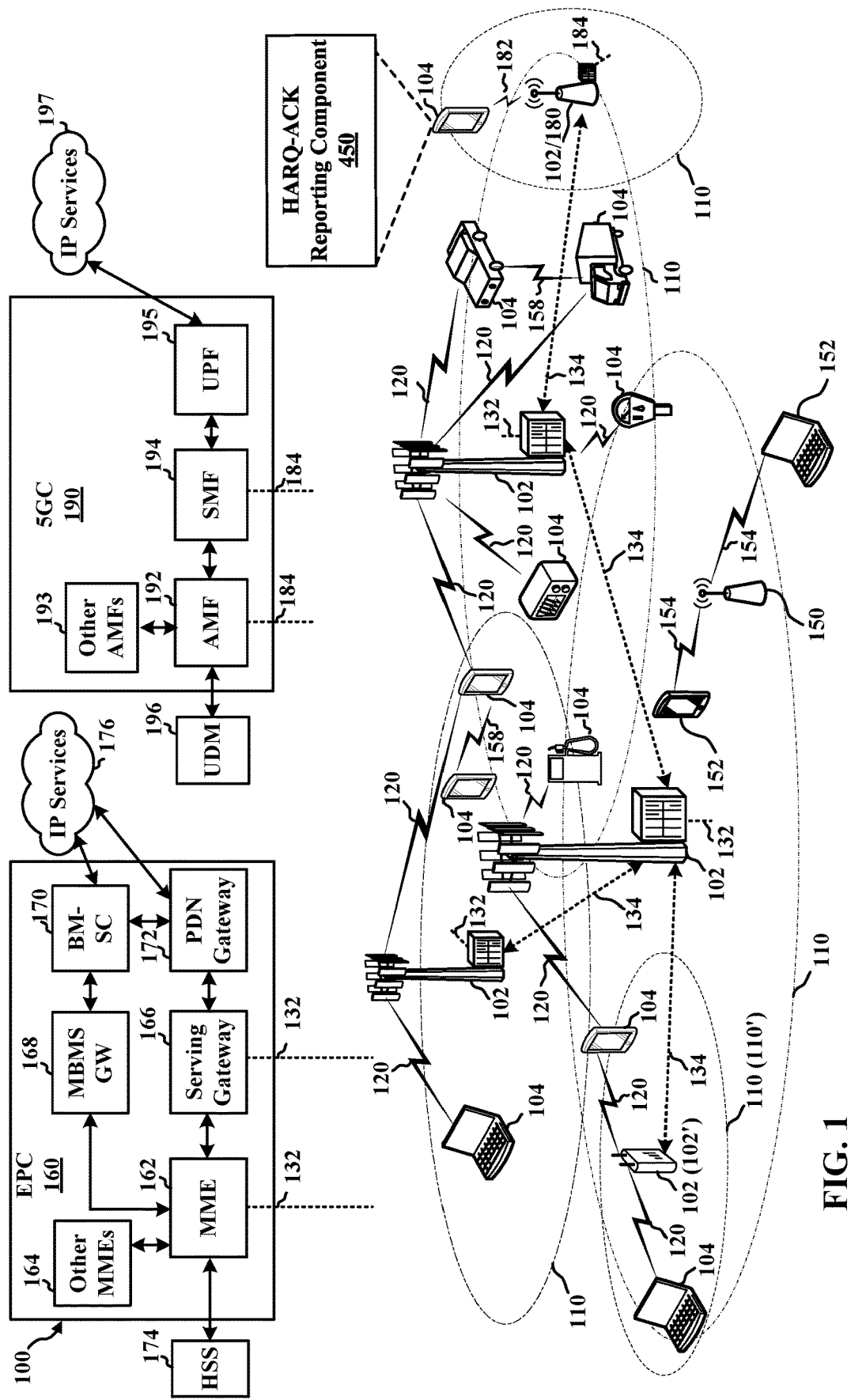
FIG. 1 is a schematic diagram of an example of a wireless communications system in accordance with aspects of the present disclosure.

In wireless communication systems, base stations may transmit semi-persistent downlink packets or signals to the user equipment (UE). The downlink packets may be transmitted on physical downlink shared channel (PDSCH) that may carry the downlink packets. In response, the UE may provide a hybrid automatic repeat request (HARQ) acknowledgment or negative acknowledgment (ACK/NACK) feedback for each of the plurality of downlink packets received at the UE. Specifically, the UE may provide HARQ-ACK/NACK feedback that includes ACK message (e.g., if the UE decodes the received PDSCH signal correctly), a NACK message (e.g., if the UE fails to receive the PDSCH signal), or discontinuous transmission (DTX) signaling (e.g., if UE receives the downlink packet/PDSCH was received, but the UE may have incorrectly detected the PDSCH signal). Thus, in such instance, if the UE decodes the signal incorrectly (e.g., cyclic redundancy check (CRC) error), the UE may send a DTX signal.

Typically, the UE may report the HARQ-ACK/NACK within K1 slots (e.g., 1 slot) of receiving the downlink packet. However, in cases of semi-persistent scheduling (SPS) PDSCH, there may be instances of collision between the uplink transmission of the HARQ-ACK/NACK and a downlink packet transmitted by the base station during the same transmission opportunity. In other words, the HARQ-ACK/NACK feedback may be interfered by the downlink transmission during the same time slot.

In some instances, following a collision, the UE may delay or defer the HARQ-ACK/NACK feedback associated with the received downlink packet to the next uplink (UL) grant physical uplink control channel (PUCCH) occasion. For example, following a collision in the K1 slot period after receiving the downlink packet in slot 0, the UE may defer to delay transmission of HARQ-ACK/NACK feedback until slot 11 when an uplink grant PUCCH occasion arises. During the delay, the UE may receive additional downlink packets during SPS PDSCH occasions (e.g., in slots 1-10). Thus, in such instance, the UE may defer or delay one or more HARQ-ACK/NACK feedback reports not only for the initial downlink packet that was received during slot 0, but also for the plurality of downlink packets received in the interim in slots 1-10.

The UE achieves the deferred transmission by accumulating at least a subset of the HARQ-ACK/NACK feedback associated with a subset of the plurality of downlink packets that are received into a consolidated feedback packet. The UE may thus transmit the consolidated feedback packet that includes the HARQ-ACK/NACK feedback for at least the subset of the plurality of downlink packets to the base station during an uplink slot. To this end, the UE may utilize first-in-first-out (FIFO) queue to accumulate or consolidate the HARQ-ACK/NACK feedback for the plurality of downlink packets from SPS PDSCH packet(s). For example, each of a plurality of SPS downlink packets or PDSCH signals may trigger a HARQ-ACK/NACK feedback reporting from the UE during the next available PUCCH. Thus, the UE may accumulate at least a set of HARQ-ACK/NACK feedback associated with a subset of SPS PDSCH packets received at the UE.

Specifically, if the total PDSCH signals received at the UE (SPS PDSCH) is D (e.g., total number of downlink packets received at the UE such as D=6), the UE may encode every L PDSCH signals (e.g., L=3 where maximum of three HARQ-ACK/NACK feedbacks associated with three SPS PDSCH are bundled together for transmission in the next uplink slot). Thus, in some aspects, the value of L may correspond to a number of the HARQ-ACK/NACK feedback for the plurality of downlink packets that can be bundled together for transmission in the uplink slot based on the size of each of the HARQ-ACK/NACK feedback (e.g., 1 or 2 bits). In some instances, the value of L may be configured by the base station.

Thus, where the total PDSCH signals received at the UE is 6 (e.g., D=6 total number of downlink packets received at the UE), and the UE is configured for L=3 (e.g., number of the HARQ-ACK/NACK feedback for the plurality of downlink packets that can be bundled together), the UE may report the HARQ-ACK/NACK feedback for first set of three HARQ-ACK/NACK feedbacks consolidated together in a first uplink slot and second set of three HARQ-ACK/NACK feedbacks consolidated together in a second uplink slot. In each of this instance, the consolidated feedback packet of a plurality of HARQ-ACK/NACK feedbacks may be equal to or less than the maximum payload size that may be transmitted in a single uplink slot.

In some instances, the UE may compress the payload size that is transmitted in each uplink slot (e.g., from 3 bits for HARQ-ACK/NACK for three PDSCH signals to a size that is less than or equal to the payload size). For example, the UE may compress or puncture the payload such that the transmitted consolidated feedback packet size is less than 3 bits (e.g., r<3, where r is the payload size configured by the base station). Thus, the value of r may be equal to or less than the value of K. The values of L and r may also be configured by the base station.

However, while the above techniques of bundling a subset of the plurality of HARQ-ACK/NACK feedback may conserve resources, such techniques also delay the transmission of HARQ-ACK/NACK feedbacks. For instance, as in above example where the total PDSCH signals received at the UE is 6 and the UE is configured for L=3 (e.g., number of the HARQ-ACK/NACK feedback for the plurality of downlink packets that can be bundled together), a second set of HARQ-ACK/NACK feedbacks consolidated together would be delayed an additional uplink slot prior to transmission. Similarly, for additional HARQ-ACK/NACK feedbacks (e.g., third set of HARQ-ACK/NACK feedbacks) would be delayed further until a third uplink slot becomes available.

For example, in some scenarios, where a high priority SPS PDSCH packet associated with a high priority SPS PDSCH configuration is received at the UE following at least six prior PDSCH packets, the transmission of the high priority HARQ-ACK/NACK feedback may be delayed in time until at least a third uplink slot becomes available or additional uplink slots where the HARQ-ACK/NACK feedback is queued waiting to be consolidated with at least two additional HARQ-ACK/NACK feedbacks in order to maximize bandwidth utilization. Such latency may adversely impact low latency/high priority communications.

Aspects of the present disclosure solve the above-identified problem by providing techniques to expedite transmissions of HARQ-ACK/NACK feedbacks based on delay constraints associated with at least SPS downlink packets received at the UE. Specifically, in accordance with aspects of the present disclosure, each of the one or more SPS PDSCH configurations may be associated with a delay parameter that identifies the maximum amount of time or slots that the UE can wait prior to transmitting the HARQ-ACK/NACK feedback associated with the PDSCH received at the UE.

Thus, in some scenarios, the base station may configure the UE for an SPS PDSCH configuration with a delay parameter (e.g., $D\_s$ where $D\_s$ is the delay in units of number of time slots). In such examples, if the UE determines that a queued HARQ-ACK/NACK feedback has exceeded the delay parameter value, the UE may transmit the HARQ-ACK/NACK in the next available uplink slot regardless of the HARQ-ACK/NACK feedback bundling (e.g., L value) and/or the position in the queue. In other words, once the queued HARQ-ACK/NACK feedback exceeds the delay parameter value, the queued HARQ-ACK/NACK may be transmitted ahead of other HARQ-ACK/NACK feedbacks that may be position in front in a FIFO queue.

For example, a buffer may have ten (10) HARQ-ACK/NACK feedbacks corresponding to ten (10) downlink packets (SPS PDSCH packets) queued for transmission. Each of the plurality of HARQ-ACK/NACK feedbacks may be configured with a delay parameter value identifying the number of slots that each of the HARQ-ACK/NACK feedbacks may remain queued prior to forced transmission of the HARQ-ACK/NACK feedback. Additionally, the UE may be configured to bundle a plurality of HARQ-ACK/NACK feedback together. For example, the UE may be configured to bundle two HARQ-ACK/NACK feedback (e.g., L=2) such that the UE may typically transmit two HARQ-ACK/NACK feedbacks in each available uplink slot. In such instance, transmission of the ten queued HARQ-ACK/NACK feedbacks may require at least five uplink slots each carrying two HARQ-ACK/NACK feedback.

However, in the event that the delay associated with one or more HARQ-ACK/NACK feedback exceeds the delay parameter value, the UE may transmit each such HARQ-ACK/NACK feedback regardless of the bundling constraint. For example, if the UE determines that the delay time has expired for each of the ten HARQ-ACK/NACK feedbacks when the uplink slot becomes available, the UE may transmit all ten HARQ-ACK/NACK feedbacks multiplexed or combined together in the next available uplink slot irrespective of the bundling constraint (e.g., bundle maximum of L=2 HARQ-ACK/NACK feedback) and other constraints. In other words, in some instances, the delay constraint requirements may supersede other transmission criteria such as bundling constraint that identify the number of HARQ-ACK/NACK feedbacks that can be bundled for a single uplink slot.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some UEs 104 of the wireless communication system may have a modem 414 and a HARQ-ACK reporting component 450 (see FIG. 4) for implementing techniques to expedite transmissions of high-priority HARQ-ACK/NACK feedbacks that have low delay constraints. As noted above, each of the one or more SPS PDSCH configurations or transmissions may be associated with a delay parameter that identifies the maximum amount of time or slots that the UE can wait prior to transmitting the HARQ-ACK/NACK feedback associated with the PDSCH received at the UE. In some aspects, the delay parameter can be priority based where SPS PDSCH configurations with higher priority may be assigned a lower delay constraint.

Thus, in the event that the delay associated with one or more HARQ-ACK/NACK feedback in a buffer or queue exceeds the delay parameter value, the HARQ-ACK reporting component 450 may be configured to transmit each such HARQ-ACK/NACK feedback regardless of optional bandwidth constraints. For example, if the UE determines that the delay time has expired for each of the ten HARQ-ACK/NACK feedbacks when the uplink slot becomes available, the HARQ-ACK reporting component 450 may transmit all ten HARQ-ACK/NACK feedbacks multiplexed or combined together in the next available uplink slot irrespective of the bundling constraint (e.g., bundle maximum of L=2 HARQ-ACK/NACK feedback) and other constraints.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
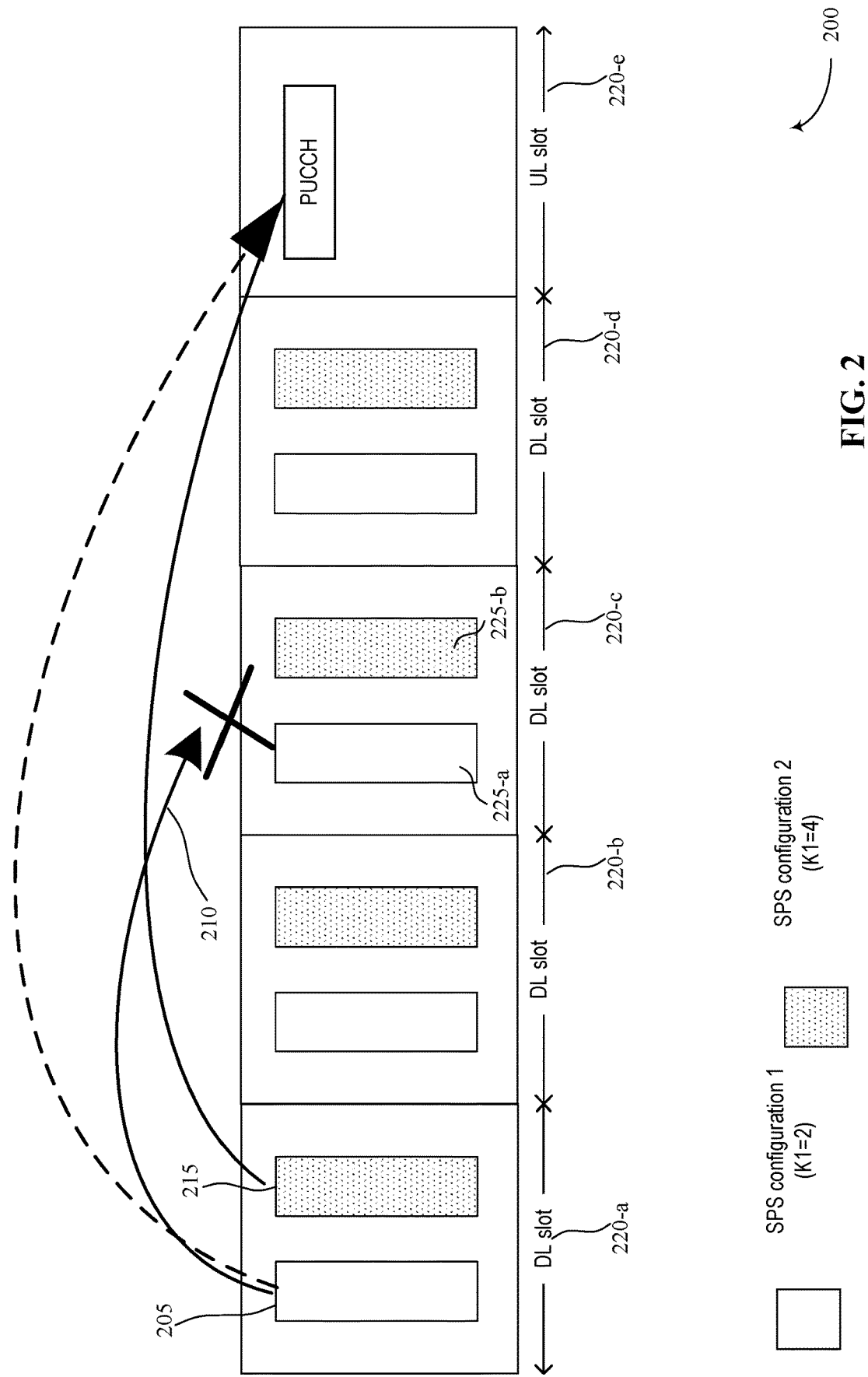
FIG. 2 is a timing diagram of an example for SPS PDSCH transmissions that may cause collision with uplink transmission of the HARQ-ACK/NACK in accordance with aspects of the present disclosure.

FIG. 2 is a timing diagram 200 for SPS PDSCH transmissions (e.g., first PDSCH downlink packet 205) that may cause collision 210 with uplink transmission of the HARQ-ACK/NACK. Specifically, as noted above, in wireless communication systems, base stations may transmit SPS downlink packets or signals (e.g., SPS PDSCH packets 205, 215, 225, etc.) to the UE. The SPS PDSCH downlink packets (or downlink packets broadly) may be transmitted on the PDSCH. In response, the UE may provide a HARQ-ACK/NACK feedback for each of the plurality of downlink packets received at the UE. Specifically, the UE may provide HARQ-ACK/NACK feedback that includes ACK message (e.g., if the UE decodes the received PDSCH signal correctly) or a NACK message (e.g., if the UE fails to receive the PDSCH signal).

The UE may be configured to report the HARQ-ACK/NACK feedback within K1 slots (e.g., number of slots after receiving the PDSCH downlink packet). An SPS PDSCH configuration may contains a plurality of SPS PDSCH occasions. Each SPS PDSCH configuration be configured with specific periodicity (p), parameter K1, and a delay parameter (D_s), the values of one or more of parameters (p, K1, D_s) may be configured for each SPS PDSCH configuration separately by the base station. For example, the first PDSCH downlink packet 205 may be received in a first SPS PDSCH configuration 220-a (interchangeably referred to as downlink or time "slot"). The first PDSCH downlink packet 205 may be configured to report the HARQ-ACK/NACK feedback within two slots (e.g., K1=2) of the UE receiving the first PDCH downlink packet 205. In other words, the UE may be configured to transmit the HARQ-ACK/NACK feedback associated with reception of the first PDSCH downlink packet 205 in third slot 220-c.

However, there may be instances of collision between the uplink transmission of the HARQ-ACK/NACK feedback and another downlink packet transmitted by the UE during the same transmission opportunity. For example, as illustrated, with respect to first PDSCH downlink packet 205 that is configured with K1=2, the HARQ-ACK/NACK feedback transmission by the UE during the third slot 220-c may collide with the scheduled downlink traffics (e.g., PDSCH downlink packets 225-a and 225-b). Thus, as illustrated in timing diagram 200, the UE cannot use the configured K1 slot (K1=2) for transmission of the HARQ-ACK/NACK feedback associated with the first PDSCH downlink packet 205 since the subsequent transmission opportunity collides with downlink traffic in the same slot.

Conversely, the second PDSCH downlink packet 215 that is also received during the first SPS PDSCH configuration 220-a may be configured to report the HARQ-ACK/NACK feedback within four slots (e.g., K1=4) or in fourth slot 220-e. In such instance, however, there is no collision because the fourth slot 220-e is reserved for uplink transmission (PUCCH opportunity).

In order to address the collision of UE transmission of the HARQ-ACK/NACK feedback associated with the first PDSCH downlink packet 205, the UE may defer the HARQ-ACK/NACK feedback reporting and channel control information of the downlink packets to the next available uplink grant 220-e (e.g., the fourth slot 220-e or opportunity) by accumulating the plurality of HARQ-ACK/NACK feedback and channel control information for transmission during a single uplink slot 220-e. During the delay, the UE may also receive additional downlink packets during SPS PDSCH configurations (e.g., slots 220-c and 220-d). Thus, in such instance, the UE may defer or delay HARQ-ACK/NACK feedback report not only for the first PDSCH downlink packet 205 that was received during the first slot 220-a, but also for each of the plurality of downlink packets received in the interim in slots 220-b, 220-c, and 220-d.

Therefore, in the uplink PUCCH opportunity (e.g., the fourth slot 220-e), the UE may consolidate the plurality of HARQ-ACK/NACK feedback reports for each of the SPS PDSCH downlink packets (e.g., PDSCH downlink packets 205, 215, 225-a, 225-b, etc.) received at the UE, and send the consolidated packet during the next uplink PUCCH occasion 220-e.

However, while such techniques of consolidating and bundling a subset of the plurality of HARQ-ACK/NACK feedback may conserve resources, such techniques also delay the transmission of HARQ-ACK/NACK feedbacks. For instance, a first SPS PDSCH downlink packet 205 that may be received at the UE may have a delay constraint of two slots (e.g., delay parameter value set at two) and a fourth SPS PDSCH downlink packet 225 may have a delay constraint of one slot (e.g., delay parameter value set at one). Additionally, the UE may be configured for L=3 (e.g., number of the HARQ-ACK/NACK feedback for the plurality of downlink packets that can be bundled together).

Thus, in some aspects, the UE may accumulate one or more HARQ-ACK/NACK feedbacks in a buffer or queue for transmission during the next available uplink slots (e.g., uplink slot 220-e and further). In current systems, the HARQ-ACK/NACK feedback associated with the fourth SPS PDSCH downlink packet 225 may be delayed beyond the first uplink slot 220-e that becomes available in order to accommodate the bundling constraint. Similarly, for additional HARQ-ACK/NACK feedbacks (e.g., third set of HARQ-ACK/NACK feedbacks) would be delayed further until a third uplink slot (not shown) becomes available.

To this end, features of the present disclosure solve the above-identified problem by providing techniques to expedite transmissions of high-priority HARQ-ACK/NACK feedbacks (e.g., the HARQ-ACK/NACK feedback associated with the fourth SPS PDSCH downlink packet 225 that has a delay constraint of one slot). Thus, in such situations, the UE may determine that a queued HARQ-ACK/NACK feedback has exceeded the delay parameter value. In such scenario, the UE may transmit the HARQ-ACK/NACK in the next available uplink slot regardless of the HARQ-ACK/NACK feedback bundling (e.g., L value) and/or the position in the queue. In other words, once the queued HARQ-ACK/NACK feedback exceeds the delay parameter value, the queued HARQ-ACK/NACK may be transmitted ahead of other HARQ-ACK/NACK feedbacks that may be position in front in a FIFO queue.

Figure 3A:
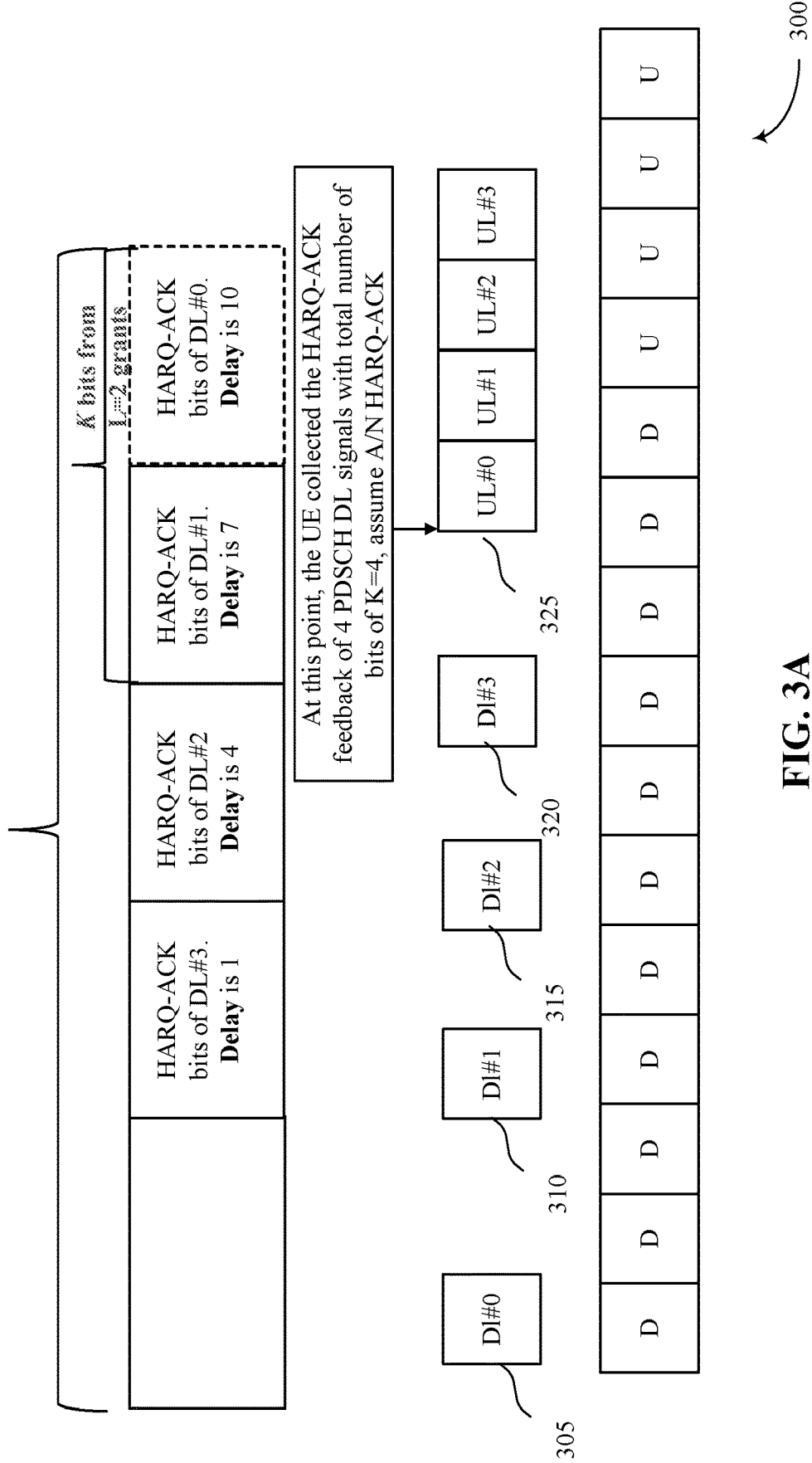
FIGS. 3A-3C are various examples of timing diagrams for the UE to accumulate and transmit HARQ-ACK/NACK feedbacks based at least in part on delay constraints in accordance with aspects of the present disclosure.
Figure 3B:
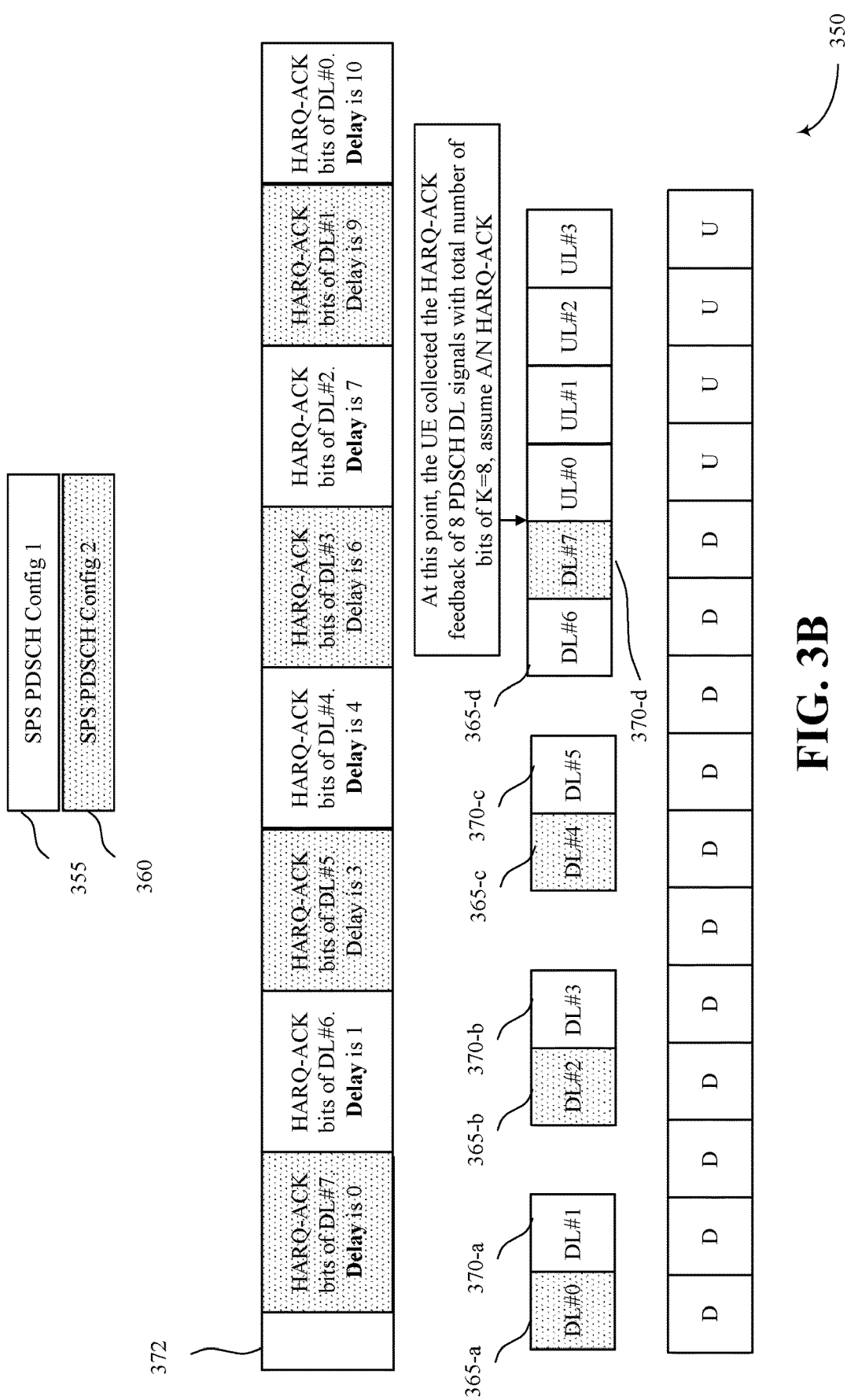

FIGS. 3A-3B are various examples of timing diagrams for the UE to accumulate and transmit HARQ-ACK/NACK feedbacks based at least in part on delay constraints. For example, with respect to FIG. 3A, the timing diagram 300 illustrates an example where the UE may be configured with delay constraint (or delay parameter value) of one slot (e.g., D_s=1) and the bundling constraint of L=2 for a plurality of downlink packets received at the UE such as first downlink packet 305 (DL #0), second downlink packet 310 (DL #1), third downlink packet 315 (DL #2), and fourth downlink packet 320 (DL #3). In such scenario, at the first uplink slot availability 325 (UL #0), the UE may determine that the delay constraint for each of the queued HARQ-ACK/NACK feedbacks exceeds the delay parameter value, and thus may transmit the entire queue to the base station.

However, if the UE is configured for D_s=4 and L=2, at the beginning of the first uplink slot 315 (UL #0), the UE may send the HARQ-ACK/NACK data of DL #0, DL #1, DL #2 and then use UL #1 to send the feedback of DL #3. In other instances, if the UE is configured with D_s=2 and L=2, at the beginning of the first uplink slot 315 (UL #0), the UE may send the HARQ_ACK of DL #0, DL #1, DL #2 (since their delay is higher than 2), while UE may wait to send the HARQ-ACK of DL #3 immediately on UL #2.

Similarly, if D_s=6 and L=2, at the beginning of the first uplink slot 315 (UL #0), the UE may send the HARQ_ACK of DL #0, DL #1 (since their delay is higher than 5). The UE may also wait to transmit the HARQ-ACK/NACK feedback associated with third downlink packet 315 (DL #2) and fourth downlink packet 320 (DL #3) until the second uplink slot (UL #2) since L=2.

As more examples, if the UE is configured with D_s=8 and L=3, at the beginning of the first uplink slot 315 (UL #0), the UE may send the HARQ_ACK of the first downlink packet 305 (DL #0), a second downlink packet 310 (DL #1), and the third downlink packet (DL #3) since L=3. Additionally, the HARQ-ACK/NACK associated with the first downlink packet 305 (DL #0) may be positioned at the head of the queue such that the UE may transmit the first positioned HARQ-ACK/NACK to the base station.

If D_s=5 and L=1, the first HARQ-ACK/NACK feedback associated with the first downlink packet 305 (DL #0) may be served on the first uplink slot 325 (UL #0), the second HARQ-ACK/NACK feedback associated with the second downlink packet 310 (DL #1) may be served on the second uplink slot (UL #1), and the third HARQ-ACK/NACK feedback associated with the third downlink packet 315 (DL #1) may be served on the third uplink slot (UL #2). Finally, the fourth HARQ-ACK/NACK feedback associated with the fourth downlink packet 320 (DL #2) may be served on the fourth uplink slot (UL #3).

In some aspects, the base station may configure the UE with the number of HARQ-ACK/NACK feedback packets to bundle (e.g., the value of L) and the delay parameter value (D_s) for each SPS PDSCH configuration. The configuration from the base station may be signaled via radio resource control (RRC), media access control element (MAC-CE), or dynamic DCI signals received at the UE from the base station.

The base station may also configure the UE with one of two mode of operation. In one example, a first mode (Mode1) may configure the UE to respect the priority among the SPS configurations and prioritize the HARQ-ACK of higher priority SPS PDSCH configurations relative to lower priority SPS PDSCH configurations. In a second mode (Mode2), the UE may be configured to respect the delay constraints (not the SPS PDSCH configuration priority) and ignore the priorities that may be assigned to each SPS configuration. However, with respect to the second mode, if the gNB configures UE with second mode communication, the base station may assign lower delay parameter value (i.e., lower delay constraint) to one or more SPS configurations in order to higher priority SPS configuration HARQ-ACK/NACK transmitted earlier in time and slot (e.g., by being transmitted in the first available uplink slot and/or positioned within the queue such that the corresponding HARQ-ACK/NACK is transmitted in earlier resources associated with the uplink slot than subsequent HARQ-ACK/NACKs transmitted within the same uplink slot).

FIG. 3B is an example 350 of multiple SPS PDSCH configuration downlink packets for which the HARQ-ACK/NACK feedback is queued in a buffer and transmitted to the base station. In some aspects, the UE may be configured with a plurality of SPS PDSCH configurations. Specifically, the base station may configure each SPS PDSCH configuration to be associated with a different configured K1 value, periodicity, L bundling, and delay parameters. For example, the first SPS PDSCH configuration 355 may be configured to report the HARQ-ACK/NACK feedback within two slots (e.g., K1=2) of the UE receiving the SPS PDSCH downlink packet and a second SPS PDSCH configuration 360 may be configured to report the HARQ-ACK/NACK feedback within two slots (e.g., K1=2) of the UE receiving the SPS PDSCH downlink packet.

In some aspects, that the K1 value may be a default configuration which may be used in absence of collisions between the uplink HARQ-ACK/NACK feedback with downlink configuration TDD such that there is no deferring of the HARQ-ACK/NACK feedbacks. However, in situations where a collision may be detected as discussed above, the bundling parameter (L value) and/or delay parameter (e.g., D_s value) may be used by the UE to accumulate and transfer a plurality of HARQ-ACK/NACK feedbacks during next uplink opportunity.

Thus, as the plurality of the HARQ-ACK/NACK feedback are accumulated or queued in the buffer 372 for transmission of the next available uplink slot (e.g., UL #0), the UE may determine the delay parameters and priority of the SPS PDSCH configuration associated with the received SPS PDSCH downlink packet (e.g., first SPS PDSCH downlink packet 365-*a* with a first SPS PDSCH configuration and/or second SPS PDSCH downlink packet 370-*a* with a second SPS PDSCH configuration). In some aspects, the first SPS PDSCH configuration may represent high priority packets for which the HARQ-ACK/NACK feedback is prioritized by configuring a shorter delay constraint. Conversely, the second SPS PDSCH configuration may represent a low priority packet for which the HARQ-ACK/NACK feedback may have a longer constraint by comparison.

Thus, at the time of the first uplink slot opportunity, there may be eight HARQ-ACK/NACK feedbacks that may be buffered associated with the eight SPS PDSCH packets (DL #0, DL #1, DL #2, etc.) that may have been received at the UE. At that instance, the UE may identify the priority level and whether the delay time for each SPS PDSCH packet exceeds the delay parameter value for the packet in order to determine which HARQ-ACK/NACK feedback(s) to transmit during the first uplink slot (UL #0). In some examples, due to the configuration of the high priority first SPS PDSCH configuration 355, the HARQ-ACK/NACK feedback for the high priority SPS PDSCH downlink packets (e.g., DL #0, DL #2, DL #4, and DL #6) may be transmitted prior to transmission of the low priority SPS PDSCH downlink packets (e.g., DL #1, DL #3, DL #5, and DL #7).

Figure 3C:
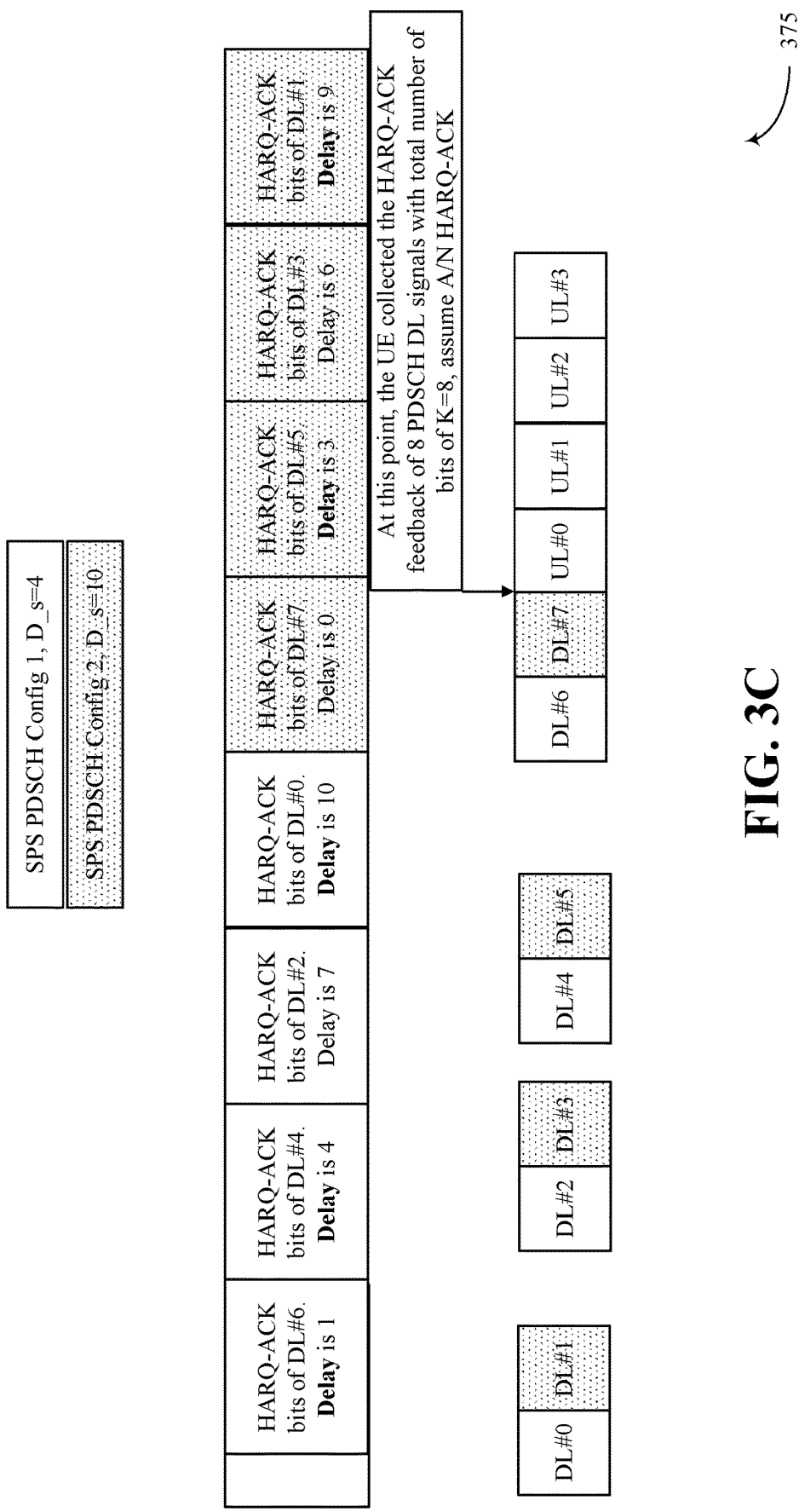

FIG. 3C is a timing diagram 375 of an effective buffer utilization after imposing the priority of different SPS PDSCH configurations with different delay constraints. In such instance, if the UE is configured in first mode (Model discussed above) with bundling value of two (e.g., L=2 where maximum of two HARQ-ACK/NACK feedbacks may be bundled together for transmission in uplink slot), the UE may select HARQ-ACK/NACK feedbacks associated with DL #1 and DL #3 (from high priority grants) and then select HARQ-ACK/NACK feedbacks of DL #6 and DL #4 (from lower priority grants) to be transmitted during the first uplink slot (UE #0).

However, if the UE is configured in second mode (Mode2), the buffer illustrated in timing diagram 375 may be implemented such that regardless of L value constraint (e.g., bundling value), the UE may transmit HARQ-ACK/NACK feedbacks associated with DL #0, DL #2, and DL #4 since each of those HARQ-ACK/NACK feedbacks exceed the delay constraint of the SPS downlink packets (e.g., D_s=4). In such scenario, none of the high priority HARQ-ACK/NACK feedbacks may be sent during the first uplink slot since the delay constraint corresponding to the high priority SPS PDSCH downlink packets (e.g., D_s=10) exceeds the delay constraint for the second SPS PDSCH configuration.

Thus, in the illustrate example, despite the high-priority of a first set of one or more SPS PDSCH downlink packets, the delay constraint associated with such packets may allow low priority SPS PDSCH packets that may have shorter delay constraint to be transmitted before the high-priority SPS PDSCH packets.

Further, as noted above, the maximum number of HARQ-ACK/NACK feedbacks to bundle or sent at an uplink grant (e.g., L value) may be configured by the UE. A global parameter may be used for all packets in the HARQ-ACK/NACK buffer/queue at the UE with respect to the bundling constraint. As such, the packets with lower delay values may be deferred to next available UL grant for potential grant. Thus, in the above example, if Lmax=4 and both SPS PDSCH configurations have an equal delay parameter of D_s=1, without the presence of Lmax constraint, the UE may send all of HARQ-ACK/NACK feedbacks at the first uplink slot. However, if Lmax is effective, then UE may transmit HARQ-ACK/NACK feedbacks associated with DL #0, DL #1, DL #2, and DL #3 on UL #0, and DL #4, and DL #5 on UL #1 if Mode 2 is utilized. Alternatively, the UE may transmit HARQ-ACK/NACK feedbacks associated DL #1, DL #3, DL #5, and DL #7 on UL #0 and DL #0, DL #2, and DL #4 on UL #1 if Mode 1 is utilized.

Therefore, if the base station requests that the UE send all packets quickly, the base station may assign low delay value for the SPS PDSCH configuration of interest. Additionally, both base station and UE may know which DL grants have data and the size of PUCCH needed to serve the HARQ-ACK packets that will be sent by the UE in each UL slot such that the base station may assign the required resources per an UL slot accordingly. Under Mode 2, if all priorities (all SPS configs) have the same delay D_s, then the queue may function as a first-in-first-out buffer where the queued HARQ-ACK/NACK feedbacks are transmitted in the order they are queued.

Figure 4:
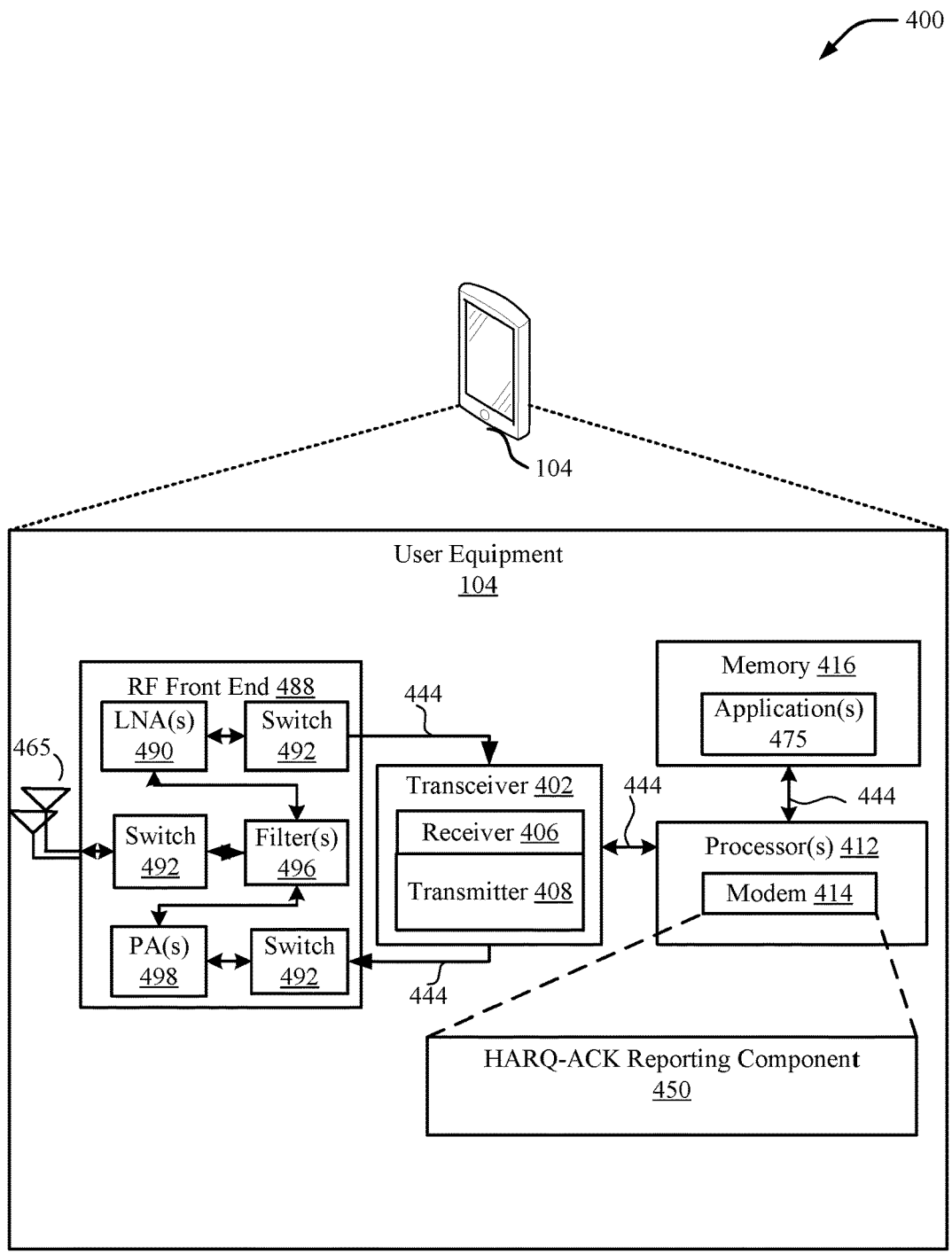
FIG. 4 is a schematic diagram of an example implementation of various components of a user equipment in accordance with various aspects of the present disclosure.

FIG. 4 illustrates a hardware components and subcomponents of a device that may be a UE 104 for implementing one or more methods (e.g., method 500) described herein in accordance with various aspects of the present disclosure. For example, one example of an implementation of the UE 104 may include a variety of components, some of which have already been described above, but including components such as one or more processors 412, memory 416 and transceiver 402 in communication via one or more buses 444, which may operate in conjunction with the HARQ-ACK reporting component 450 to perform functions described herein related to including one or more methods (e.g., 500) of the present disclosure.

Particularly, the HARQ-ACK reporting component 450 may report a consolidated HARQ-ACK/NACK feedback packet that includes feedback related to SPS downlink packet(s) received at the UE. The HARQ-ACK reporting component 450 may utilize a queue to accumulate or consolidate the HARQ-ACK/NACK feedback for the plurality of downlink packets from SPS PDSCH packet(s) by encoding the corresponding bits in order to transmit the consolidated feedback packet to the base station in an uplink grant period.

The one or more processors 412, modem 414, memory 416, transceiver 402, RF front end 488 and one or more antennas 465, may be configured to support voice and/or data calls (simultaneously or non-simultaneously) in one or more radio access technologies. In an aspect, the one or more processors 412 can include a modem 414 that uses one or more modem processors. The various functions related to HARQ-ACK reporting component 450 may be included in modem 414 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 414 associated with HARQ-ACK reporting component 450 may be performed by transceiver 402.

The memory 416 may be configured to store data used herein and/or local versions of application(s) 475 or HARQ-ACK reporting component 450 and/or one or more of its subcomponents being executed by at least one processor 412. The memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 416 may be a non-transitory computer-readable storage medium that stores one or more computer-executable codes defining HARQ-ACK reporting component 450 and/or one or more of its subcomponents, and/or data associated therewith, when the UE 104 is operating at least one processor 412 to execute HARQ-ACK reporting component 450 and/or one or more of its subcomponents.

The transceiver 402 may include at least one receiver 406 and at least one transmitter 408. The receiver 406 may include hardware, firmware, and/or software code executable by a processor for receiving data, the code comprising instructions and being stored in a memory (e.g., computer-readable medium). The receiver 406 may be, for example, a radio frequency (RF) receiver. In an aspect, the receiver 406 may receive signals transmitted by at least one UE 104. Additionally, receiver 406 may process such received signals, and also may obtain measurements of the signals, such as, but not limited to, Ec/Io, SNR, RSRP, RSSI, etc. The transmitter 408 may include hardware, firmware, and/or software code executable by a processor for transmitting data, the code comprising instructions and being stored in a memory (e.g., computer-readable medium). A suitable example of the transmitter 408 may including, but is not limited to, an RF transmitter.

Moreover, in an aspect, transmitting device may include the RF front end 488, which may operate in communication with one or more antennas 465 and transceiver 402 for receiving and transmitting radio transmissions, for example, wireless communications transmitted by at least one base station 102 or wireless transmissions transmitted by UE 104. The RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, the LNA 490 can amplify a received signal at a desired output level. In an aspect, each LNA 490 may have a specified minimum and maximum gain values. In an aspect, the RF front end 488 may use one or more switches 492 to select a particular LNA 490 and its specified gain value based on a desired gain value for a particular application.

Further, for example, one or more PA(s) 498 may be used by the RF front end 488 to amplify a signal for an RF output at a desired output power level. In an aspect, each PA 498 may have specified minimum and maximum gain values. In an aspect, the RF front end 488 may use one or more switches 492 to select a particular PA 498 and its specified gain value based on a desired gain value for a particular application.

Also, for example, one or more filters 496 can be used by the RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, the RF front end 488 can use one or more switches 492 to select a transmit or receive path using a specified filter 496, LNA 490, and/or PA 498, based on a configuration as specified by the transceiver 402 and/or processor 412.

As such, the transceiver 402 may be configured to transmit and receive wireless signals through one or more antennas 465 via the RF front end 488. In an aspect, the transceiver 402 may be tuned to operate at specified frequencies such that transmitting device can communicate with, for example, one or more base stations 102 or one or more cells associated with one or more base stations 102 or other UEs 104. In an aspect, for example, the modem 414 can configure the transceiver 402 to operate at a specified frequency and power level based on the configuration of the transmitting device and the communication protocol used by the modem 414.

In an aspect, the modem 414 can be a multiband-multimode modem, which can process digital data and communicate with the transceiver 402 such that the digital data is sent and received using the transceiver 402. In an aspect, the modem 414 can be multiband and be configured to support multiple frequency bands for a specific communications protocol. In an aspect, the modem 414 can be multimode and be configured to support multiple operating networks and communications protocols. In an aspect, the modem 414 can control one or more components of transmitting device (e.g., RF front end 488, transceiver 402) to enable transmission and/or reception of signals from the network based on a specified modem configuration. In an aspect, the modem configuration can be based on the mode of the modem 414 and the frequency band in use. In another aspect, the modem configuration can be based on UE configuration information associated with transmitting device as provided by the network during cell selection and/or cell reselection.

Figure 5:
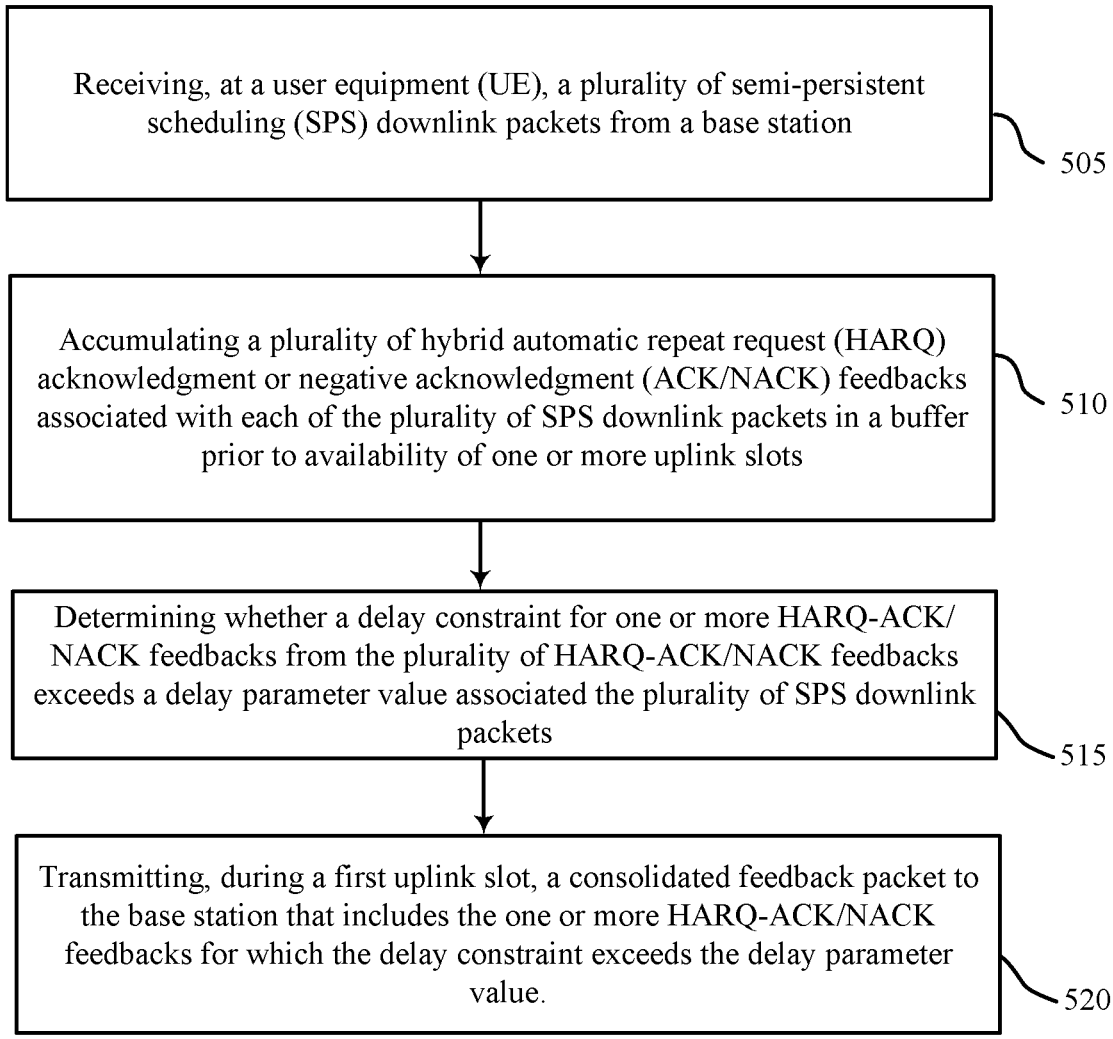
FIG. 5 is a flow diagram of an example of a method of wireless communication implemented by the UE in accordance with aspects of the present disclosure.

Referring to FIG. 5, an example method 500 for wireless communications in accordance with aspects of the present disclosure may be performed by one or more UEs 104 discussed with reference to FIGS. 1 and 4. Although the method 500 is described below with respect to the elements of the UE 104, other components may be used to implement one or more of the steps described herein.

At block 505, the method 500 may include receiving, at a UE, a plurality of SPS downlink packets from a base station. Aspects of block 505 may be performed by the transceiver 402 and HARQ-ACK reporting component 450 as described with reference to FIG. 4. Thus, HARQ-ACK reporting component 450, transceiver 402, one or more antennas 465, modem 414, processor 412, and/or the UE 104 or one of its subcomponents may define the means for receiving, at a UE, a plurality of SPS downlink packets from a base station.

At block 510, the method 500 may include accumulating a plurality of HARQ-ACK/NACK feedbacks associated with each of the plurality of SPS downlink packets in a buffer prior to availability of one or more uplink slots. The method may include determining a mode of communication that the UE is configured for HARQ-ACK/NACK reporting.

In some examples, the mode of communication may include a first mode where the UE prioritizes transmission of the one or more HARQ-ACK/NACK feedbacks based on a priority value associated with the plurality of SPS downlink packets and a second mode where the UE prioritizes transmission of the one or more HARQ-ACK/NACK feedbacks based on the delay constraint associated with the plurality of SPS downlink packets.

In some aspects, accumulating the plurality of HARQ-ACK/NACK feedbacks associated with each of the plurality of SPS downlink packets in the buffer prior to availability of one or more uplink slots comprises queuing the plurality of HARQ-ACK/NACK feedbacks within the buffer based on a delay constraint in HARQ-ACK/NACK feedback reporting associated with each of the SPS downlink packets received at the UE.

In other examples, accumulating the plurality of HARQ-ACK/NACK feedbacks associated with each of the plurality of SPS downlink packets in the buffer prior to availability of one or more uplink slots comprises queuing the plurality of HARQ-ACK/NACK feedbacks within the buffer based on a first-in-first-out time that the SPS downlink packets are received at the UE.

Aspects of block 510 may be performed by HARQ-ACK reporting component 450 as described with reference to FIG. 4. Thus, HARQ-ACK reporting component 450, one or more antennas 465, modem 414, processor 412, and/or the UE 104 or one of its subcomponents may define the means for accumulating a plurality of HARQ-ACK/NACK feedbacks associated with each of the plurality of SPS downlink packets in a buffer prior to availability of one or more uplink slots.

At block 515, the method 500 may include determining whether a delay constraint for one or more HARQ-ACK/NACK feedbacks from the plurality of HARQ-ACK/NACK feedbacks exceeds a delay parameter value associated the plurality of SPS downlink packets. In some examples, determining whether the delay constraint for one or more HARQ-ACK/NACK feedbacks exceeds the delay parameter value associated the plurality of SPS downlink packets comprises determining a number of slots that each of the plurality of HARQ-ACK/NACK feedbacks have been queued in the buffer since being received at the UE prior to a first uplink slot becoming available. The method may also include determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks. Aspects of block 515 may be performed by HARQ-ACK reporting component 450 as described with reference to FIG. 4. Thus, HARQ-ACK reporting component 450, one or more antennas 465, modem 414, processor 412, and/or the UE 104 or one of its subcomponents may define the means for determining whether a delay constraint for one or more HARQ-ACK/NACK feedbacks from the plurality of HARQ-ACK/NACK feedbacks exceeds a delay parameter value associated the plurality of SPS downlink packets.

At block 520, the method 500 may include transmitting, during a first uplink slot, a consolidated feedback packet to the base station that includes the one or more HARQ-ACK/NACK feedbacks for which the delay constraint exceeds the delay parameter value in a first uplink slot. In some examples, transmitting the consolidated feedback packet to the base station during the first uplink slot comprises determining a maximum number of HARQ-ACK/NACK feedbacks that the UE is configured to bundle for a single uplink slot and determining that a number of HARQ-ACK/NACK feedbacks for which the delay constraint exceeds the delay parameter value is greater than the maximum number of HARQ-ACK/NACK feedbacks that the UE is configured to bundle. The method may also include overriding the maximum number of HARQ-ACK/NACK feedbacks that the UE is configured to bundle for the single uplink slot. In some aspects, the UE may also delay transmission of the one or more HARQ-ACK/NACK feedbacks for which the delay constraint does not exceed the delay parameter value until at least a second uplink slot.

In some examples, the base station may configure the maximum number of HARQ-ACK/NACK feedbacks that the UE is configured to bundle via one or more of radio resource control (RRC), media access control element (MAC-CE), or dynamic downlink control information (DCI) signals received at the UE from the base station.

Aspects of block 520 may be performed by the transceiver 402 and HARQ-ACK reporting component 450 as described with reference to FIG. 4. Thus, HARQ-ACK reporting component 450, transceiver 402, one or more antennas 465, modem 414, processor 412, and/or the UE 104 or one of its subcomponents may define the means for transmitting a consolidated feedback packet to the base station that includes the one or more HARQ-ACK/NACK feedbacks for which the delay constraint exceeds the delay parameter value.

SOME FURTHER EXAMPLE CLAUSES

Implementation examples are described in the following numbered clauses:

1. A method for wireless communications, comprising:
    receiving, at a user equipment (UE), a plurality of semi-persistent scheduling (SPS) downlink packets from a base station;
    accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
    determining whether a delay constraint for one or more HARQ-ACK/NACK feedbacks from the plurality of HARQ-ACK/NACK feedbacks exceeds a delay parameter value associated the plurality of SPS downlink packets; and
    transmitting, during a first uplink slot, a consolidated feedback packet to the base station that includes the one or more HARQ-ACK/NACK feedbacks for which the delay constraint exceeds the delay parameter value.

2. The method of clause 1, wherein determining whether the delay constraint for the one or more HARQ-ACK/NACK feedbacks exceeds the delay parameter value associated the plurality of SPS downlink packets comprises:
    determining a number of slots that each of the plurality of HARQ-ACK/NACK feedbacks have been queued in the buffer since being received at the UE prior to a first uplink slot becoming available; and
    determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

3. The method of clauses 1 or 2, wherein transmitting the consolidated feedback packet to the base station during the first uplink slot comprises:
   determining a maximum number of HARQ-ACK/NACK feedbacks that the UE is configured to bundle for a single uplink slot;
   determining that a number of HARQ-ACK/NACK feedbacks for which the delay constraint exceeds the delay parameter value is greater than the maximum number of HARQ-ACK/NACK feedbacks that the UE is configured to bundle; and
   overriding the maximum number of HARQ-ACK/NACK feedbacks that the UE is configured to bundle for the single uplink slot.

4. The method of any of the preceding clauses 1-3, wherein the base station configures the maximum number of HARQ-ACK/NACK feedbacks that the UE is configured to bundle via one or more of radio resource control (RRC), media access control element (MAC-CE), or dynamic downlink control information (DCI) signals received at the UE from the base station.

5. The method of any of the preceding clauses 1-4, further comprising:
   determining a mode of communication that the UE is configured for HARQ-ACK/NACK reporting,
   wherein the mode of communication includes a first mode where the UE prioritizes transmission of the one or more HARQ-ACK/NACK feedbacks based on a priority value associated with the plurality of SPS downlink packets and a second mode where the UE prioritizes transmission of the one or more HARQ-ACK/NACK feedbacks based on the delay constraint associated with the plurality of SPS downlink packets.

6. The method of any of the preceding clauses 1-5, further comprising:
   delaying transmission of the one or more HARQ-ACK/NACK feedbacks for which the delay constraint does not exceed the delay parameter value until at least a second uplink slot.

7. The method of any of the preceding clauses 1-6, wherein accumulating the plurality of HARQ-ACK/NACK feedbacks associated with each of the plurality of SPS downlink packets in the buffer prior to availability of one or more uplink slots comprises:
   queuing the plurality of HARQ-ACK/NACK feedbacks within the buffer based on a delay constraint in HARQ-ACK/NACK feedback reporting associated with each of the SPS downlink packets received at the UE.

8. The method of any of the preceding clauses 1-7, wherein accumulating the plurality of HARQ-ACK/NACK feedbacks associated with each of the plurality of SPS downlink packets in the buffer prior to availability of one or more uplink slots comprises:
   queuing the plurality of HARQ-ACK/NACK feedbacks within the buffer based on a first-in-first-out time that the SPS downlink packets are received at the UE.

9. An apparatus for wireless communications, comprising:
   at least one processor;
   and memory coupled to the at least one processor, the memory including instructions executable by the at least one processor to cause the apparatus to:
   receive, at a user equipment (UE), a plurality of semi-persistent scheduling (SPS) downlink packets from a base station;
   accumulate a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
   determine whether a delay constraint for one or more HARQ-ACK/NACK feedbacks from the plurality of HARQ-ACK/NACK feedbacks exceeds a delay parameter value associated the plurality of SPS downlink packets; and
   transmit, during a first uplink slot, a consolidated feedback packet to the base station that includes the one or more HARQ-ACK/NACK feedbacks for which the delay constraint exceeds the delay parameter value.

10. The apparatus of clause 9, wherein the instruction to determine whether the delay constraint for the one or more HARQ-ACK/NACK feedbacks exceeds the delay parameter value associated the plurality of SPS downlink packets are further executable by the at least one processor to cause the apparatus to:
   determine a number of slots that each of the plurality of HARQ-ACK/NACK feedbacks have been queued in the buffer since being received at the UE prior to a first uplink slot becoming available; and
   determine whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

11. The apparatus of clauses 9 or 10, wherein the instruction to transmit the consolidated feedback packet to the base station during the first uplink slot is further executable by the at least one processor to cause the apparatus to:
   determine a maximum number of HARQ-ACK/NACK feedbacks that the UE is configured to bundle for a single uplink slot;
   determine that a number of HARQ-ACK/NACK feedbacks for which the delay constraint exceeds the delay parameter value is greater than the maximum number of HARQ-ACK/NACK feedbacks that the UE is configured to bundle; and
   override the maximum number of HARQ-ACK/NACK feedbacks that the UE is configured to bundle for the single uplink slot.

12. The apparatus of any of the preceding clauses 9-11, wherein the base station configures the maximum number of HARQ-ACK/NACK feedbacks that the UE is configured to bundle via one or more of radio resource control (RRC), media access control element (MAC-CE), or dynamic downlink control information (DCI) signals received at the UE from the base station.

13. The apparatus of any of the preceding clauses 9-12, wherein the memory including instructions is further executable by the at least one processor to cause the apparatus to:
   determine a mode of communication that the UE is configured for HARQ-ACK/NACK reporting,
   wherein the mode of communication includes a first mode where the UE prioritizes transmission of the one or more HARQ-ACK/NACK feedbacks based on a priority value associated with the plurality of SPS downlink packets and a second mode where the UE prioritizes transmission of the one or more HARQ-ACK/NACK feedbacks based on the delay constraint associated with the plurality of SPS downlink packets.

14. The apparatus of any of the preceding clauses 9-13, wherein the memory including instructions is further executable by the at least one processor to cause the apparatus to:
delay transmission of the one or more HARQ-ACK/NACK feedbacks for which the delay constraint does not exceed the delay parameter value until at least a second uplink slot.

15. The apparatus of any of the preceding clauses 9-14, wherein the instruction to accumulate the plurality of HARQ-ACK/NACK feedbacks associated with each of the plurality of SPS downlink packets in the buffer prior to availability of one or more uplink slots are further executable by the at least one processor to cause the apparatus to:
queue the plurality of HARQ-ACK/NACK feedbacks within the buffer based on a delay constraint in HARQ-ACK/NACK feedback reporting associated with each of the SPS downlink packets received at the UE.

16. The apparatus of any of the preceding clauses 9-15, wherein the instruction to accumulate the plurality of HARQ-ACK/NACK feedbacks associated with each of the plurality of SPS downlink packets in the buffer prior to availability of one or more uplink slots are further executable by the at least one processor to cause the apparatus to:
queuing the plurality of HARQ-ACK/NACK feedbacks within the buffer based on a first-in-first-out time that the SPS downlink packets are received at the UE.

17. A non-transitory computer readable medium storing instructions, executable by a processor, for wireless communications, comprising instructions for:
receiving, at a user equipment (UE), a plurality of semi-persistent scheduling (SPS) downlink packets from a base station;
accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
determining whether a delay constraint for one or more HARQ-ACK/NACK feedbacks from the plurality of HARQ-ACK/NACK feedbacks exceeds a delay parameter value associated the plurality of SPS downlink packets; and
transmitting, during a first uplink slot, a consolidated feedback packet to the base station that includes the one or more HARQ-ACK/NACK feedbacks for which the delay constraint exceeds the delay parameter value.

18. The non-transitory computer readable medium of clause 17, wherein the instructions for determining whether the delay constraint for the one or more HARQ-ACK/NACK feedbacks exceeds the delay parameter value associated the plurality of SPS downlink packets further include instructions for:
determining a number of slots that each of the plurality of HARQ-ACK/NACK feedbacks have been queued in the buffer since being received at the UE prior to a first uplink slot becoming available; and
determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

19. The non-transitory computer readable medium of clauses 17 or 18, wherein the instructions for transmitting the consolidated feedback packet to the base station during the first uplink slot further include instructions for:
determining a maximum number of HARQ-ACK/NACK feedbacks that the UE is configured to bundle for a single uplink slot;
determining that a number of HARQ-ACK/NACK feedbacks for which the delay constraint exceeds the delay parameter value is greater than the maximum number of HARQ-ACK/NACK feedbacks that the UE is configured to bundle; and
overriding the maximum number of HARQ-ACK/NACK feedbacks that the UE is configured to bundle for the single uplink slot.

20. The non-transitory computer readable medium of any of the preceding clauses 17-19, wherein the base station configures the maximum number of HARQ-ACK/NACK feedbacks that the UE is configured to bundle via one or more of radio resource control (RRC), media access control element (MAC-CE), or dynamic downlink control information (DCI) signals received at the UE from the base station.

21. The non-transitory computer readable medium of any of the preceding clauses 17-20, further comprising instructions for:
determining a mode of communication that the UE is configured for HARQ-ACK/NACK reporting,
wherein the mode of communication includes a first mode where the UE prioritizes transmission of the one or more HARQ-ACK/NACK feedbacks based on a priority value associated with the plurality of SPS downlink packets and a second mode where the UE prioritizes transmission of the one or more HARQ-ACK/NACK feedbacks based on the delay constraint associated with the plurality of SPS downlink packets.

22. The non-transitory computer readable medium of any of the preceding clauses 17-21, further comprising instructions for:
delaying transmission of the one or more HARQ-ACK/NACK feedbacks for which the delay constraint does not exceed the delay parameter value until at least a second uplink slot.

23. The non-transitory computer readable medium of any of the preceding clauses 17-22, wherein the instructions for accumulating the plurality of HARQ-ACK/NACK feedbacks associated with each of the plurality of SPS downlink packets in the buffer prior to availability of one or more uplink slots further include instructions for:
queuing the plurality of HARQ-ACK/NACK feedbacks within the buffer based on a delay constraint in HARQ-ACK/NACK feedback reporting associated with each of the SPS downlink packets received at the UE.

24. The non-transitory computer readable medium of any of the preceding clauses 17-23, wherein the instructions for accumulating the plurality of HARQ-ACK/NACK feedbacks associated with each of the plurality of SPS downlink packets in the buffer prior to availability of one or more uplink slots further include instructions for:
queuing the plurality of HARQ-ACK/NACK feedbacks within the buffer based on a first-in-first-out time that the SPS downlink packets are received at the UE.

25. An apparatus for wireless communications, comprising:
means for receiving, at a user equipment (UE), a plurality of semi-persistent scheduling (SPS) downlink packets from a base station;
means for accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
means for determining whether a delay constraint for one or more HARQ-ACK/NACK feedbacks from the plurality of HARQ-ACK/NACK feedbacks exceeds a delay parameter value associated the plurality of SPS downlink packets; and
means for transmitting, during a first uplink slot, a consolidated feedback packet to the base station that includes the one or more HARQ-ACK/NACK feedbacks for which the delay constraint exceeds the delay parameter value.

26. The apparatus of clause 25, wherein the means for determining whether the delay constraint for the one or more HARQ-ACK/NACK feedbacks exceeds the delay parameter value associated the plurality of SPS downlink packets comprises:
means for determining a number of slots that each of the plurality of HARQ-ACK/NACK feedbacks have been queued in the buffer since being received at the UE prior to a first uplink slot becoming available; and
means for determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

27. The apparatus of clauses 25 or 26, wherein the means for transmitting the consolidated feedback packet to the base station during the first uplink slot comprises:
means for determining a maximum number of HARQ-ACK/NACK feedbacks that the UE is configured to bundle for a single uplink slot;
means for determining that a number of HARQ-ACK/NACK feedbacks for which the delay constraint exceeds the delay parameter value is greater than the maximum number of HARQ-ACK/NACK feedbacks that the UE is configured to bundle; and
means for overriding the maximum number of HARQ-ACK/NACK feedbacks that the UE is configured to bundle for the single uplink slot.

28. The apparatus of any of the preceding clauses 25-27, wherein the base station configures the maximum number of HARQ-ACK/NACK feedbacks that the UE is configured to bundle via one or more of radio resource control (RRC), media access control element (MAC-CE), or dynamic downlink control information (DCI) signals received at the UE from the base station.

29. The apparatus of any of the preceding clauses 25-28, further comprising:
means for determining a mode of communication that the UE is configured for HARQ-ACK/NACK reporting,
wherein the mode of communication includes a first mode where the UE prioritizes transmission of the one or more HARQ-ACK/NACK feedbacks based on a priority value associated with the plurality of SPS downlink packets and a second mode where the UE prioritizes transmission of the one or more HARQ-ACK/NACK feedbacks based on the delay constraint associated with the plurality of SPS downlink packets.

30. The apparatus of any of the preceding clauses 25-29, further comprising:
means for delaying transmission of the one or more HARQ-ACK/NACK feedbacks for which the delay constraint does not exceed the delay parameter value until at least a second uplink slot.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication performed by a user equipment (UE), comprising:
   receiving a plurality of semi-persistent scheduling (SPS) downlink packets from a base station;
   accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
   determining whether a delay constraint for one or more HARQ-ACK/NACK feedbacks from the plurality of HARQ-ACK/NACK feedbacks exceeds a delay parameter value associated the plurality of SPS downlink packets;
   prioritizing transmission of the one or more HARQ-ACK/NACK feedbacks based on a priority value associated with the plurality of SPS downlink packets; and
   transmitting, during a first uplink slot, a consolidated feedback packet to the base station that includes the one or more HARQ-ACK/NACK feedbacks for which the delay constraint exceeds the delay parameter value.

2. The method of claim 1, wherein determining whether the delay constraint for the one or more HARQ-ACK/NACK feedbacks exceeds the delay parameter value associated the plurality of SPS downlink packets comprises:
   determining a number of slots that each of the plurality of HARQ-ACK/NACK feedbacks have been queued in the buffer since being received at the UE prior to the first uplink slot becoming available; and
   determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

3. The method of claim 1, further comprising:
   delaying transmission of the one or more HARQ-ACK/NACK feedbacks for which the delay constraint does not exceed the delay parameter value until at least a second uplink slot.

4. The method of claim 1, wherein accumulating the plurality of HARQ-ACK/NACK feedbacks associated with each of the plurality of SPS downlink packets in the buffer prior to availability of the one or more uplink slots comprises:
   queuing the plurality of HARQ-ACK/NACK feedbacks within the buffer based on the delay constraint.

5. The method of claim 1, wherein accumulating the plurality of HARQ-ACK/NACK feedbacks associated with each of the plurality of SPS downlink packets in the buffer prior to availability of the one or more uplink slots comprises:
   queuing the plurality of HARQ-ACK/NACK feedbacks within the buffer based on a first-in-first-out time that the SPS downlink packets are received at the UE.

6. A method of wireless communication performed by a user equipment (UE), comprising:
   receiving a plurality of semi-persistent scheduling (SPS) downlink packets from a base station;
   accumulating a plurality of hybrid automatic repeat request (HARD) acknowledgment or negative acknowledgment (ACK/NACK) feedbacks associated with each of the plurality of SPS downlink packets in a buffer prior to availability of one or more uplink slots;
   determining whether a delay constraint for one or more HARQ-ACK/NACK feedbacks from the plurality of HARQ-ACK/NACK feedbacks exceeds a delay parameter value associated the plurality of SPS downlink packets; and
   transmitting, during a first uplink slot, a consolidated feedback packet to the base station that includes the one or more HARQ-ACK/NACK feedbacks for which the delay constraint exceeds the delay parameter value, wherein transmitting the consolidated feedback packet to the base station during the first uplink slot comprises:
      determining a maximum number of HARQ-ACK/NACK feedbacks that the UE is configured to bundle for a single uplink slot;
      determining that a number of HARQ-ACK/NACK feedbacks for which the delay constraint exceeds the delay parameter value is greater than the maximum number of HARQ-ACK/NACK feedbacks that the UE is configured to bundle; and
      overriding the maximum number of HARQ-ACK/NACK feedbacks that the UE is configured to bundle for the single uplink slot.

7. The method of claim 6, further comprising:
   receiving, from the base station, a configuration of the maximum number of HARQ-ACK/NACK feedbacks that the UE is configured to bundle via one or more of radio resource control (RRC) signaling, media access control element (MAC-CE) signaling, or dynamic downlink control information (DCI).

8. An apparatus for wireless communication, comprising:
   at least one processor; and
   and memory coupled to the at least one processor, wherein the at least one processor is configured to:
      receive a plurality of semi-persistent scheduling (SPS) downlink packets from a base station;
      accumulate a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
      determine whether a delay constraint for one or more HARQ-ACK/NACK feedbacks from the plurality of HARQ-ACK/NACK feedbacks exceeds a delay parameter value associated the plurality of SPS downlink packets;
      prioritize transmission of the one or more HARQ-ACK/NACK feedbacks based on a priority value associated with the plurality of SPS downlink packets; and
      transmit, during a first uplink slot, a consolidated feedback packet to the base station that includes the one or more HARQ-ACK/NACK feedbacks for which the delay constraint exceeds the delay parameter value.

9. The apparatus of claim 8, wherein, to determine whether the delay constraint for the one or more HARQ-ACK/NACK feedbacks exceeds the delay parameter value associated the plurality of SPS downlink packets, the at least one processor is configured to:
   determine a number of slots that each of the plurality of HARQ-ACK/NACK feedbacks have been queued in the buffer prior to the first uplink slot becoming available; and
   determine whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

10. The apparatus of claim 8, wherein the at least one processor is configured to:
  delay transmission of the one or more HARQ-ACK/NACK feedbacks for which the delay constraint does not exceed the delay parameter value until at least a second uplink slot.

11. The apparatus of claim 8, wherein, to accumulate the plurality of HARQ-ACK/NACK feedbacks associated with each of the plurality of SPS downlink packets in the buffer prior to availability of the one or more uplink slots, the at least one processor is configured to:
  queue the plurality of HARQ-ACK/NACK feedbacks within the buffer based on the delay constraint.

12. The apparatus of claim 8, wherein, to accumulate the plurality of HARQ-ACK/NACK feedbacks associated with each of the plurality of SPS downlink packets in the buffer prior to availability of the one or more uplink slots, the at least one processor is configured to:
  queue the plurality of HARQ-ACK/NACK feedbacks within the buffer based on a first-in-first-out time that the SPS downlink packets are received.

13. An apparatus for wireless communication, comprising:
  at least one processor; and
  and memory coupled to the at least one processor, wherein the at least one processor is configured to:
    receive a plurality of semi-persistent scheduling (SPS) downlink packets from a base station;
    accumulate a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
    determine whether a delay constraint for one or more HARQ-ACK/NACK feedbacks from the plurality of HARQ-ACK/NACK feedbacks exceeds a delay parameter value associated the plurality of SPS downlink packets; and
    transmit, during a first uplink slot, a consolidated feedback packet to the base station that includes the one or more HARQ-ACK/NACK feedbacks for which the delay constraint exceeds the delay parameter value, wherein, to transmit the consolidated feedback packet to the base station during the first uplink slot, the at least one processor is configured to:
      determine a maximum number of HARQ-ACK/NACK feedbacks for bundling for a single uplink slot;
      determine that a number of HARQ-ACK/NACK feedbacks for which the delay constraint exceeds the delay parameter value is greater than the maximum number of HARQ-ACK/NACK feedbacks; and
      override the maximum number of HARQ-ACK/NACK feedbacks.

14. The apparatus of claim 13, wherein the at least one processor is configured to receive a configuration of the maximum number of HARQ-ACK/NACK feedbacks via one or more of radio resource control (RRC) signaling, media access control element (MAC-CE) signaling, or dynamic downlink control information (DCI).

15. A method of wireless communication performed by a user equipment (UE), comprising:
  receiving a plurality of semi-persistent scheduling (SPS) downlink packets from a base station;
  accumulating a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
  determining whether a delay constraint for one or more HARQ-ACK/NACK feedbacks from the plurality of HARQ-ACK/NACK feedbacks exceeds a delay parameter value associated the plurality of SPS downlink packets;
  prioritizing transmission of the one or more HARQ-ACK/NACK feedbacks based on the delay constraint associated with the plurality of SPS downlink packets; and
  transmitting, during a first uplink slot, a consolidated feedback packet to the base station that includes the one or more HARQ-ACK/NACK feedbacks for which the delay constraint exceeds the delay parameter value.

16. The method of claim 15, wherein determining whether the delay constraint for the one or more HARQ-ACK/NACK feedbacks exceeds the delay parameter value associated the plurality of SPS downlink packets comprises:
  determining a number of slots that each of the plurality of HARQ-ACK/NACK feedbacks have been queued in the buffer since being received at the UE prior to the first uplink slot becoming available; and
  determining whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

17. The method of claim 15, further comprising:
  delaying transmission of the one or more HARQ-ACK/NACK feedbacks for which the delay constraint does not exceed the delay parameter value until at least a second uplink slot.

18. The method of claim 15, wherein accumulating the plurality of HARQ-ACK/NACK feedbacks associated with each of the plurality of SPS downlink packets in the buffer prior to availability of the one or more uplink slots comprises:
  queuing the plurality of HARQ-ACK/NACK feedbacks within the buffer based on the delay constraint.

19. The method of claim 15, wherein accumulating the plurality of HARQ-ACK/NACK feedbacks associated with each of the plurality of SPS downlink packets in the buffer prior to availability of the one or more uplink slots comprises:
  queuing the plurality of HARQ-ACK/NACK feedbacks within the buffer based on a first-in-first-out time that the SPS downlink packets are received at the UE.

20. An apparatus for wireless communication, comprising:
  at least one processor; and
  and memory coupled to the at least one processor, wherein the at least one processor is configured to:
    receive a plurality of semi-persistent scheduling (SPS) downlink packets from a base station;
    accumulate a plurality of hybrid automatic repeat request (HARQ) acknowledgment or negative acknowledgment (ACK/NACK) feedbacks associated with each of the plurality of SPS downlink packets in a buffer prior to availability of one or more uplink slots;
    determine whether a delay constraint for one or more HARQ-ACK/NACK feedbacks from the plurality of HARQ-ACK/NACK feedbacks exceeds a delay parameter value associated the plurality of SPS downlink packets;

prioritize transmission of the one or more HARQ-ACK/NACK feedbacks based on the delay constraint associated with the plurality of SPS downlink packets; and transmit, during a first uplink slot, a consolidated feedback packet to the base station that includes the one or more HARQ-ACK/NACK feedbacks for which the delay constraint exceeds the delay parameter value.

21. The apparatus of claim 20, wherein, to determine whether the delay constraint for the one or more HARQ-ACK/NACK feedbacks exceeds the delay parameter value associated the plurality of SPS downlink packets, the at least one processor is configured to:

determine a number of slots that each of the plurality of HARQ-ACK/NACK feedbacks have been queued in the buffer prior to the first uplink slot becoming available; and determine whether the number of slots that the one or more HARQ-ACK/NACK feedbacks from the plurality of HARQ-ACK/NACK feedbacks have been queued in the buffer exceeds the delay parameter value for each of the plurality of HARQ-ACK/NACK feedbacks.

22. The apparatus of claim 20, wherein the at least one processor is configured to:

delay transmission of the one or more HARQ-ACK/NACK feedbacks for which the delay constraint does not exceed the delay parameter value until at least a second uplink slot.

23. The apparatus of claim 20, wherein, to accumulate the plurality of HARQ-ACK/NACK feedbacks associated with each of the plurality of SPS downlink packets in the buffer prior to availability of the one or more uplink slots, the at least one processor is configured to:

queue the plurality of HARQ-ACK/NACK feedbacks within the buffer based on the delay constraint.

24. The apparatus of claim 20, wherein, to accumulate the plurality of HARQ-ACK/NACK feedbacks associated with each of the plurality of SPS downlink packets in the buffer prior to availability of the one or more uplink slots, the at least one processor is configured to:

queue the plurality of HARQ-ACK/NACK feedbacks within the buffer based on a first-in-first-out time that the SPS downlink packets are received.

* * * * *

UNITED STATES PATENT AND TRADEMARK OFFICE
CERTIFICATE OF CORRECTION

PATENT NO. : 11,950,238 B2  
APPLICATION NO. : 17/400802  
DATED : April 2, 2024  
INVENTOR(S) : Ahmed Elshafie et al.

Page 1 of 1

It is certified that error appears in the above-identified patent and that said Letters Patent is hereby corrected as shown below:

In the Specification  
Column 2, Line 17: "associated the plurality" should read "associated with the plurality"  
Column 2, Line 36: "associated the plurality" should read "associated with the plurality"  
Column 2, Line 55: "associated the plurality" should read "associated with the plurality"  
Column 3, Line 5: "associated the plurality" should read "associated with the plurality"  
Column 17, Line 36: "associated the plurality" should read "associated with the plurality"  
Column 17, Line 40: "associated the plurality" should read "associated with the plurality"  
Column 17, Line 58: "associated the plurality" should read "associated with the plurality"  
Column 18, Line 46: "associated the plurality" should read "associated with the plurality"  
Column 18, Line 56: "associated the plurality" should read "associated with the plurality"  
Column 20, Line 13: "associated the plurality" should read "associated with the plurality"  
Column 20, Line 23: "associated the plurality" should read "associated with the plurality"  
Column 21, Line 53: "associated the plurality" should read "associated with the plurality"  
Column 21, Line 64: "associated the plurality" should read "associated with the plurality"  
Column 23, Line 24: "associated the plurality" should read "associated with the plurality"  
Column 23, Line 34: "associated the plurality" should read "associated with the plurality"

In the Claims  
Column 27, Line 14: "associated the plurality" should read "associated with the plurality"  
Column 27, Line 27: "associated the plurality" should read "associated with the plurality"  
Column 28, Line 2: "associated the plurality" should read "associated with the plurality"  
Column 28, Line 43: "associated the plurality" should read "associated with the plurality"  
Column 28, Line 57: "associated the plurality" should read "associated with the plurality"  
Column 29, Line 38: "associated the plurality" should read "associated with the plurality"  
Column 30, Line 9: "associated the plurality" should read "associated with the plurality"  
Column 30, Lines 21-22: "associated the plurality" should read "associated with the plurality"  
Column 31, Line 2: "associated the plurality" should read "associated with the plurality"  
Column 31, Line 16: "associated the plurality" should read "associated with the plurality"

Signed and Sealed this  
Eighth Day of April, 2025

Coke Morgan Stewart  
*Acting Director of the United States Patent and Trademark Office*